(12) United States Patent
Cipkar

(10) Patent No.: US 7,559,763 B2
(45) Date of Patent: Jul. 14, 2009

(54) DUAL MATERIAL INJECTION MOLD AND METHOD

(75) Inventor: William A. Cipkar, Amherstburg (CA)

(73) Assignee: Crest Mold Technology Inc. (CA)

( * ) Notice: Subject to any disclaimer, the term of this patent is extended or adjusted under 35 U.S.C. 154(b) by 430 days.

(21) Appl. No.: 11/471,212

(22) Filed: Jun. 20, 2006

(65) Prior Publication Data

US 2006/0284336 A1 Dec. 21, 2006

Related U.S. Application Data

(60) Provisional application No. 60/692,297, filed on Jun. 20, 2005.

(51) Int. Cl.
*B29C 45/10* (2006.01)
(52) U.S. Cl. .................. 425/577; 425/112; 425/125; 425/468; 425/574; 264/255
(58) Field of Classification Search .......... 425/558, 425/573, 112, 125, 134, 574, 577; 264/252, 264/255
See application file for complete search history.

(56) References Cited

U.S. PATENT DOCUMENTS

| | | | | |
|---|---|---|---|---|
| 2,724,868 A * | 11/1955 | Kish | .................. | 264/46.6 |
| 4,184,835 A * | 1/1980 | Talbot | .................. | 425/577 |
| 5,618,485 A * | 4/1997 | Gajewski | .................. | 264/255 |
| 5,882,567 A * | 3/1999 | Cavallaro et al. | .......... | 264/255 |
| 6,413,460 B1 * | 7/2002 | Wisniewski et al. | ......... | 264/254 |
| 2001/0008320 A1 * | 7/2001 | Scolamiero | ................. | 264/250 |
| 2003/0001411 A1 * | 1/2003 | Gedritis et al. | .............. | 296/192 |
| 2005/0037105 A1 * | 2/2005 | Dry et al. | ................... | 425/130 |
| 2005/0227042 A1 * | 10/2005 | Cowelchuk et al. | ......... | 428/137 |
| 2005/0227043 A1 * | 10/2005 | Schoemann et al. | ......... | 428/137 |
| 2006/0226574 A1 * | 10/2006 | Bozio et al. | ................. | 264/248 |

FOREIGN PATENT DOCUMENTS

WO WO 2004/113046 A2 12/2004

OTHER PUBLICATIONS

Digiantonio, R.J., "Two-Shot Molding of Thermoplastic Elastomers", Plastics 101, Presented at Society of Plastics Engineers ANTEC '92, Detroit, MI, May 1992.

(Continued)

*Primary Examiner*—Joseph S. Del Sole
*Assistant Examiner*—Timothy Kennedy
(74) *Attorney, Agent, or Firm*—Warn Partners, P.C.

(57) ABSTRACT

A two-shot injection molding assembly is provided where the tooling that creates the mold for the first material can be retracted and the tooling that creates the mold for the second material can be inserted. The first material tool blocks the mold area that is intended for the second material to be injected. After the first material is injected into the mold, the first material tool can be retracted and replaced with the second material tool. The second material tool creates a side for the mold that is used to form the second material injected into the mold, and a spring based wedge forms the other side of the mold. By having the first material tool retracted and replaced with the second material tool, the core plate does not have to be rotated.

10 Claims, 2 Drawing Sheets

OTHER PUBLICATIONS

Author Unknown, "Co-Injection Molding", Plastics 101, http://pages.prodigy.net/plastics101/other.pdf, Date Unknown.

Author Unknown, "3-D MID: Three Dimensional Molded Interconnect Devices", Lehrstuhl Für Kunststofftechnik, Universität Erlangen-Nürnberg, Date Unknown.

Author Unknown, "Multi-Shot and Co-Injection", EPCO Machinery LLC, 2003.

Author Unknown, "Plastics—Two Shot Injection Molding", JobShop.com, http://www.jobshop.com/techinfo/plastic2shotinjmolddef.shtml, Mar. 2004.

Author Unknown, "Applications", http://www.rjginc.com/CavPsi/applications.htm, Feb. 2004.

* cited by examiner

DUAL MATERIAL INJECTION MOLD AND METHOD

CROSS-REFERENCE TO RELATED APPLICATIONS

This application claims the benefit of U.S. Provisional Application No. 60/692,297, filed Jun. 20, 2005. The disclosures of the above applications are incorporated herein by reference.

FIELD OF THE INVENTION

The present invention generally relates to a material injection mold assembly and method.

BACKGROUND OF THE INVENTION

Typically, two-shot injection molding assemblies are used in order to create a plastic part made of two different materials or two different colors of the same material or different material. A typical two-shot injection molding assembly will inject the first material into the mold while the area of the mold that is intended for the second material is blocked off. After that the mold is opened, the core plate is rotated, the mold is blocked off again, and the second material is injected into the mold. After the second material is injected, the material from the first and second injection touch and form a mechanical bond while cooling. However, an undesirable seam is created where the two different materials bond together, and cracking can occur if the first injected material solidifies before the second material is injected due to the differential shrinkage. Also, the time it takes to open and close the mold and rotate the core plate adds additional production time which raises the cost of production.

Accordingly, it is desirable to have an injection molding assembly with fewer limitations. It is also desirable to have an injection molding assembly that can finish the injection molding process by having only one injection molding cycle. In addition, it is desirable to have a dual material injection molding process that produces a seamless multi-material and/or multi-colored product.

SUMMARY OF THE INVENTION

In accordance with the general teachings of the present invention, a two-shot injection molding assembly is provided where the tooling that creates the mold for the first material can be retracted and the tooling that creates the mold for the second material can be inserted. The first material tool creates one side of the mold that is used to form the first material injected into the mold. The first material tool blocks the mold area that is intended for the second material to be injected. After the first material is injected into the mold, the first material tool can be retracted and replaced with the second material tool. The second material tool creates sides for the mold that is used to form the second material injected into the mold. By having the first material tool retracted and replaced with the second material tool the present invention reduces the production time.

Another aspect of the present invention is a spring loaded wedge system. As the first material tool is in the first shot position, the spring in the wedge system is expanded. When the first material tool is retracted and the second material tool is inserted, the second material tool forces the spring to compress in order to create the second shot molding area. After the second material is injected, the second material tool releases the pressure on the wedge, and the spring can expand. When the spring is in the expanded position, the wedge no longer creates a side to the second material mold area so that the molded product can be ejected.

One aspect of the present invention is a method for a dual injection molding assembly where the first material tool is inserted and forms the molding area for the first material. Next, the first material tool is retracted and replaced with the second material tool, which forms the molding area for the second material.

According to another aspect of the present invention, a cylinder is used to insert and retract the first material tool. After the first material tool has been retracted the second material tool can be inserted.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
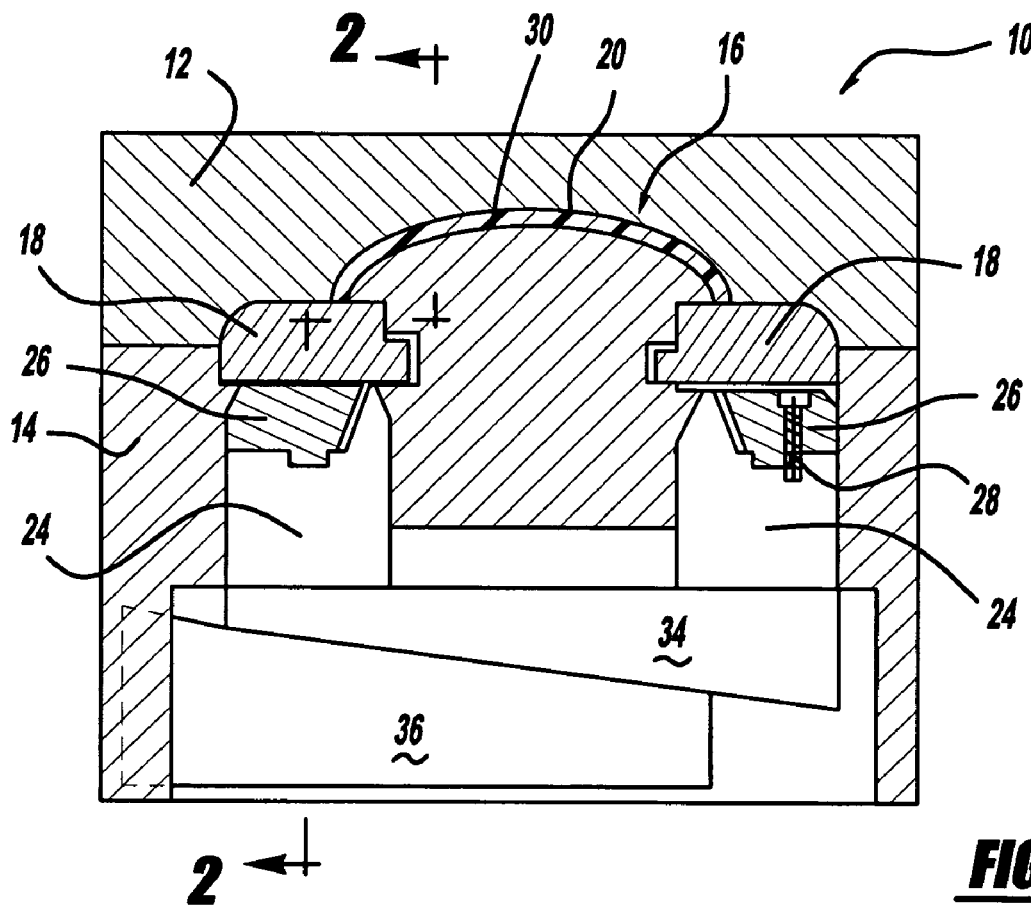
FIG. 1 is a cross-sectional plan view of the molding assembly in accordance with the present invention.
Figure 2A:
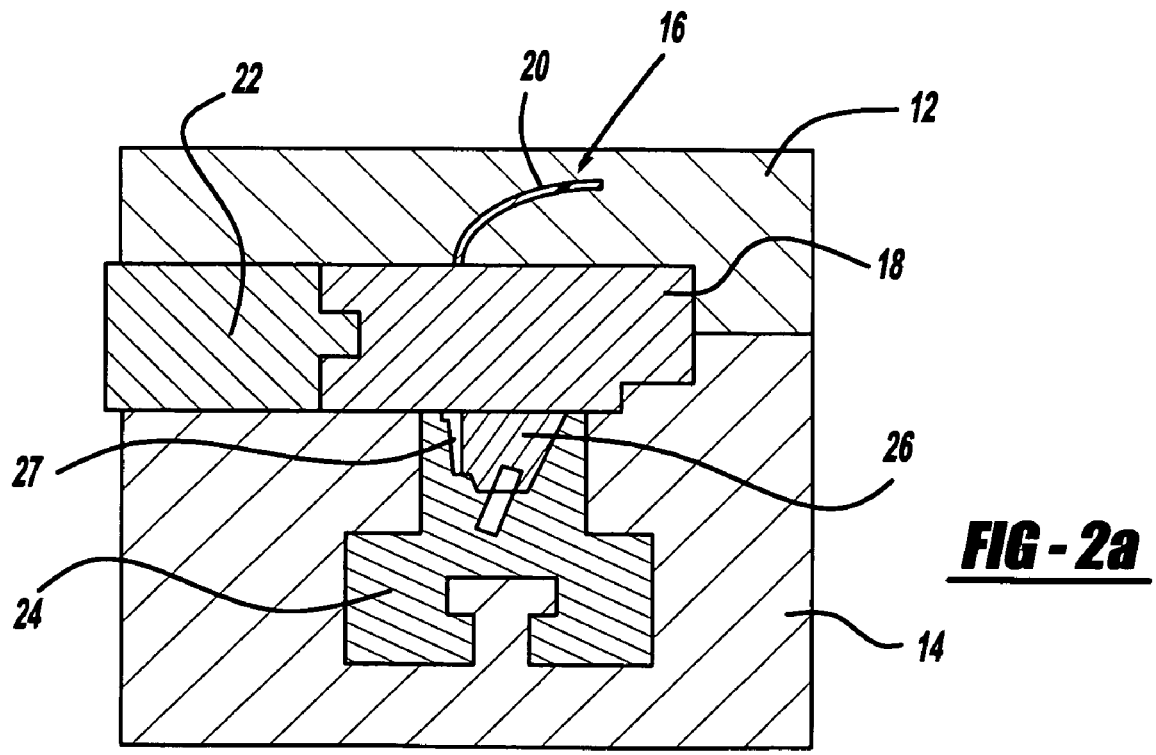
FIGS. 2a and 2b is a cross-sectional plan view of the molding assembly in accordance with the present invention.
Figure 2B:
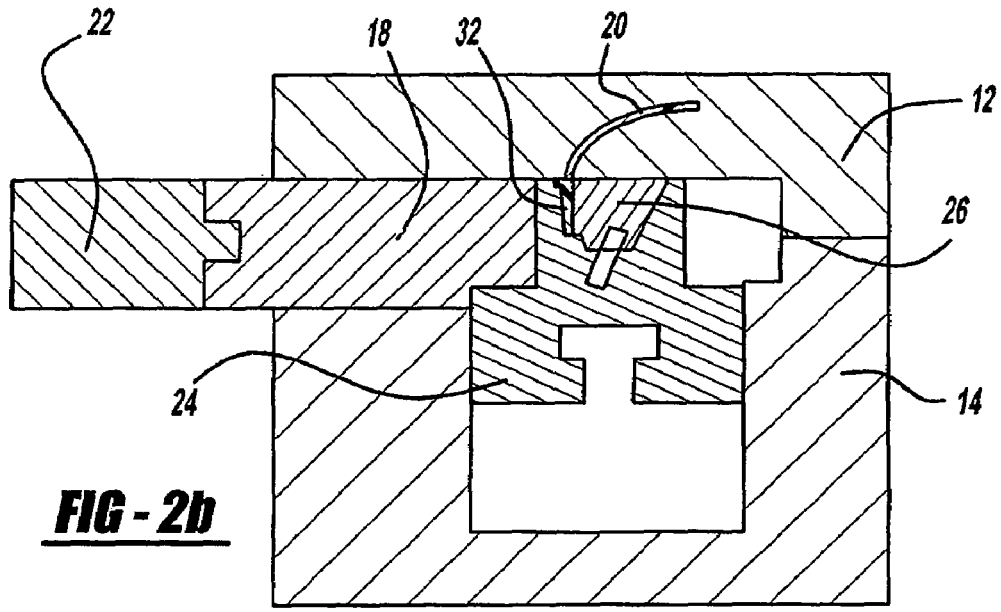
Figure 3:
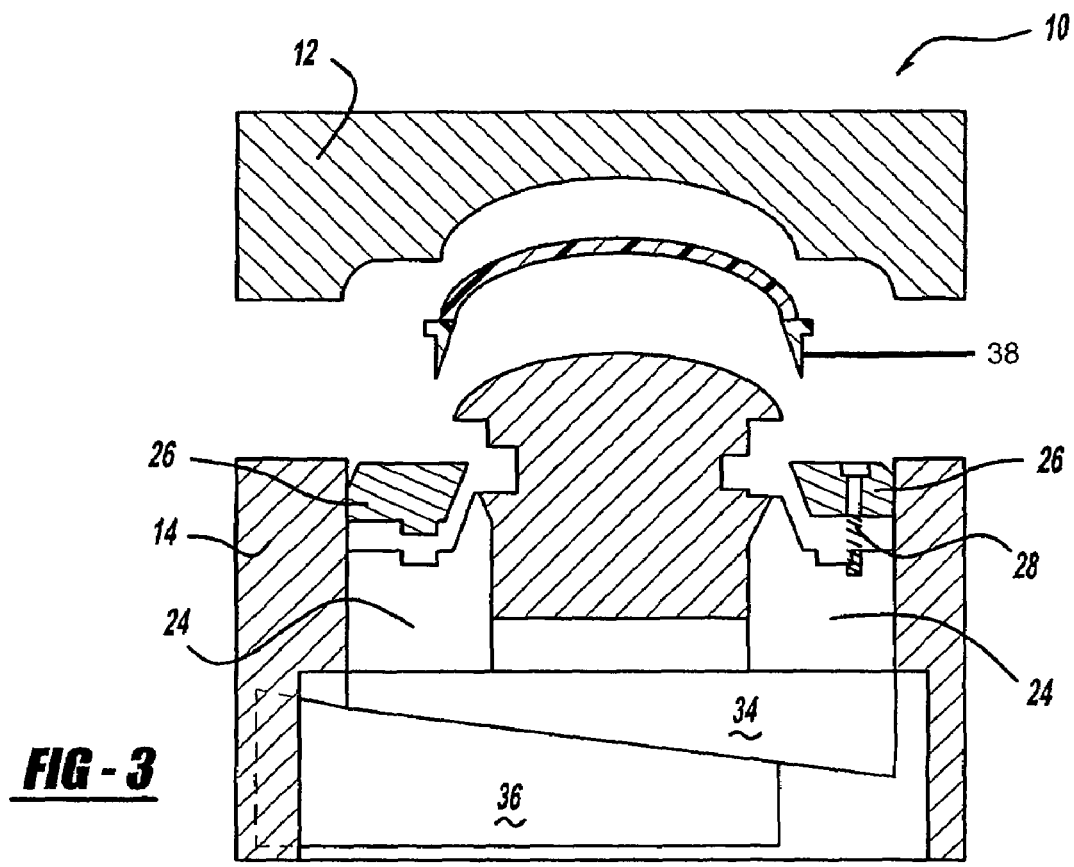
FIG. 3 is a cross-sectional plan view of the molding assembly wherein the molded part is being removed.

Referring now to FIGS. 1-3 a molding assembly 10 is shown. The molding assembly 10 has an upper platen 12 and a lower platen 14 that when placed adjacent one another form a mold cavity 16 for creating a molded part 38.

A first tool 18 is inserted between the upper platen 12 and lower platen 14 to create a first shot area 20. The first tool 18 blocks off a portion of the mold cavity 16 to create the first shot area 20. The first shot area 20 is a portion of the mold cavity 16 that will receive a first shot material 30. The first shot material 30 can be injected into the mold cavity 16. It is within the scope of this invention to use more than one first tool 18 member so that there are a plurality of tools that can each be individually be removed in order to create first, second, third, fourth, etc. shot areas for injecting a plurality of shot materials into the mold cavity 16. Thus, it is within the scope of this invention to have more than one tool that is similar to the first tool inserted into the mold cavity 16.

The first tool 18 is connected to a cylinder 22. The cylinder 22 will slide the first tool 18 into and out of the mold cavity 16. The cylinder 22 is part of or connected to an actuator that facilitates the sliding movement of the first tool 18 into and out of the mold cavity 16. The cylinder 22 can be part of a hydraulic actuator or can be connected to said form of hydraulics for causing the movement of the first tool 18.

When the first tool 18 is moved out of the mold cavity 16 a second tool 24 positioned below the first tool 18 will be exposed to the mold cavity. The second tool 24, which is also referred to as a drop insert tool can be raised so that a portion of the surface of the second tool 24 comes into contact with the mold cavity 16. In another aspect of the invention, the second tool 24 has a wedge 26 connected to its surface. The wedge 26 together with the second tool 24 form a second shot area 27 of the mold cavity. When the second shot area 27 has been created a second shot material 32 can be injected into the mold cavity 16 adjacent the first shot material 30. The first shot material 30 and second shot material 32 can be different colors, or different types of material which are then molded or bonded together yielding a molded part 38 having at least two different materials or colors of the same material formed together.

In another aspect of the invention the second tool 24 is connected to or contacts a vertical wedge 34. The vertical wedge 34 moves vertically with respect to the mold cavity to cause the second tool 24 to move into position to form the second shot area 27. The vertical wedge 34 has an incline that contacts with a horizontal wedge 36 which also has an incline. The horizontal wedge 36 slides along a parallel plane with respect to the vertical wedge 34 so that the inclined surfaces of the vertical wedge 34 and horizontal wedge 36 contact and move together. The movement of the horizontal wedge 36 with respect to the vertical wedge 34 causes the vertical wedge 34 to be raised and lowered, and thus the second tool 24 moves vertically with respect to the lower platen 14. The horizontal wedge is connected to an actuator such as a hydraulic actuator which causes the movement of the horizontal wedge 36 with respect to the vertical wedge 34.

In another aspect of the invention the wedge 26 is connected to the second tool 24 by a wedge spring 28. The wedge spring 28 biases the wedge 26 to an extended position when the wedge 26 is not compressed against the first platen 12. When the upper platen 12 and lower platen 14 are compressed together the wedge 26 will compress the wedge spring 28 so that the wedge 26 is placed in a retracted position. When the upper platen 12 and lower platen 14 are separated, for example when it is time to remove the molded part 38 the wedge spring 28 will move the wedge 26 to an extended position which facilitates the removal of the molded part 38 by popping the molded part 38 out of the mold cavity 16 for ease of removal. It should be noted that when the first tool 18 is in the first shot position, the second tool 24 is positioned below the first tool such that the wedge 26 is in the extended position. This prevents the wedge 26 from interfering with the movement of the first tool 18 into and out of the mold cavity 16.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A molding assembly comprising:
   an upper platen having a forming surface;
   a lower platen having a forming surface, wherein said lower platen abuts said upper platen to form a mold cavity;
   a plurality of independently slidable tools inserted into said mold cavity for creating a plurality of shot areas as each individual independently slidable tool is retracted from said mold cavity; and
   a drop insert tool insertable into said mold cavity into an area previously occupied by said independently slidable tools after all of said plurality of independently slidable tools have been retracted from said mold cavity.

2. The molding assembly of claim 1 further comprising a wedge movably fixed to said drop insert tool.

3. The molding assembly of claim 2 further comprising a wedge spring connecting said wedge to said drop insert tool, wherein said wedge spring biases said wedge to move from a retracted position to an extended position.

4. The molding assembly of claim 1 further comprising a plurality of cylinders each independently connected to said plurality of independently slidable tools, wherein said plurality of cylinders slides each independently slidable tool into and out of said mold cavity.

5. The molding assembly of claim 1 further comprising:
   a vertical wedge contacting said drop insert tool;
   a horizontal wedge slidably contacting said vertical wedge, wherein said horizontal wedge slides with respect to said vertical wedge to move said drop insert tool into and out of said mold cavity.

6. A molding assembly comprising:
   an upper platen having a forming surface;
   a lower platen abutting said upper platen to form a mold cavity;
   a first tool slidably inserted into said mold cavity creating a first shot area of said mold cavity; and
   a second tool adjacent said first tool, wherein said second tool slides upward when said first tool slides away from said mold cavity, wherein said second tool creates a second shot area of said mold cavity in an area previously occupied by said first tool.

7. The molding assembly of claim 6 further comprising a wedge movably fixed to said second tool.

8. The molding assembly of claim 7 further comprising a wedge spring connecting said wedge to said second tool, wherein said wedge spring biases said wedge to move from a retracted position to an extended position.

9. The molding assembly of claim 6 further comprising a cylinder connected to said first tool, wherein said cylinder slides said first tool between a first shot position and a second shot position.

10. The molding assembly of claim 6 further comprising:
    a vertical wedge contacting said second tool;
    a horizontal wedge slidably contacting said vertical wedge, wherein said horizontal wedge slides with respect to said vertical wedge to move said second tool between said first shot position and said second shot position.

* * * * *